Figure 1:
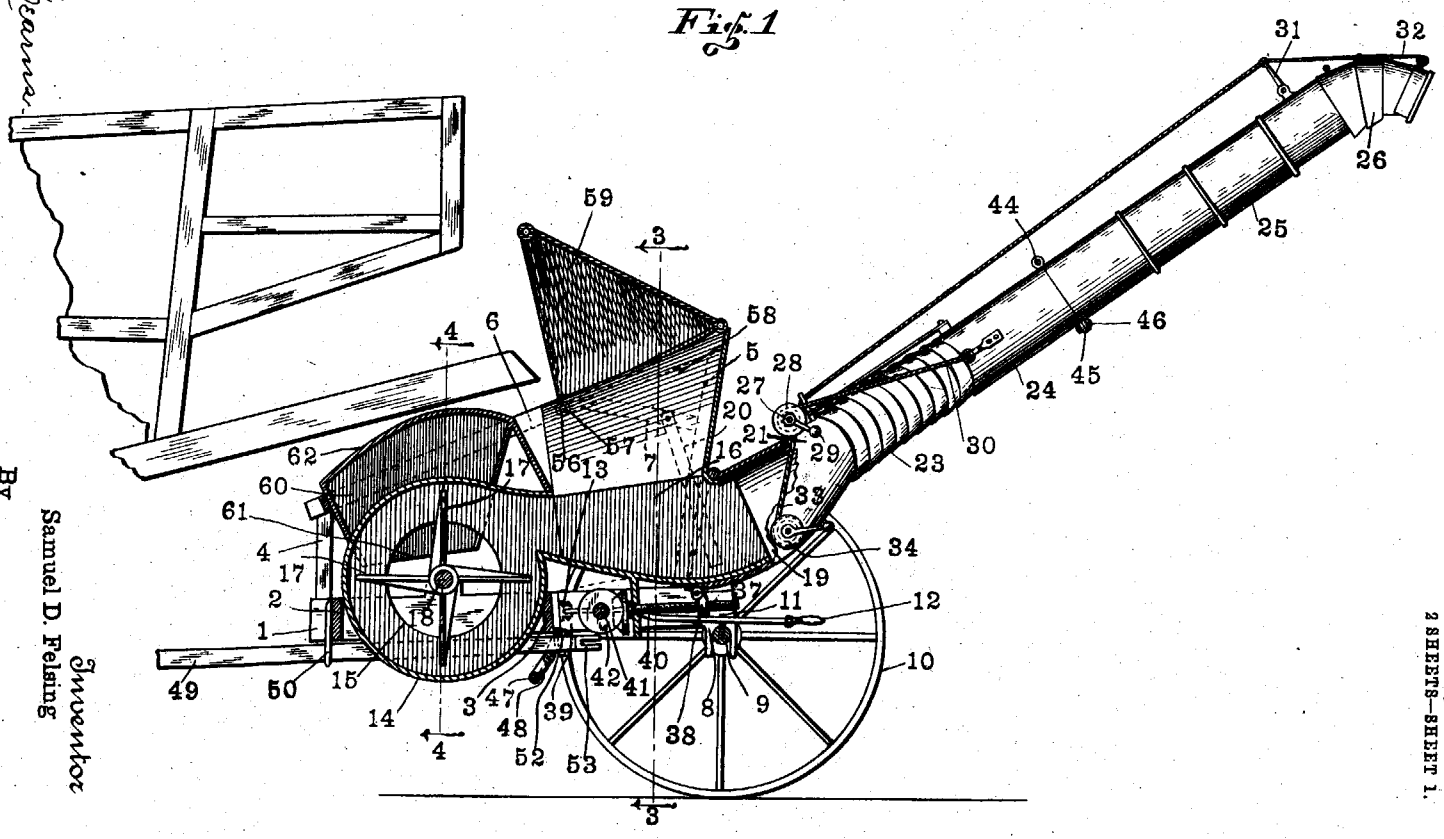

S. D. FELSING.

PNEUMATIC STRAW STACKER.

APPLICATION FILED JAN. 13, 1905.

Reissued Nov. 16, 1909.

13,039.

2 SHEETS—SHEET 1.

Witnesses
Adelaide Kearns
J. A. Walsh

Inventor
Samuel D. Felsing
By
Bradford & Hood
Attorneys

ANDREW B. GRAHAM CO., PHOTO-LITHOGRAPHERS, WASHINGTON, D. C.

S. D. FELSING.

PNEUMATIC STRAW STACKER.

APPLICATION FILED JAN. 13, 1905.

Reissued Nov. 16, 1909.

13,039.

2 SHEETS—SHEET 2.

Witnesses
Adelaide Kearns.
J. A. Walsh.

Inventor
Samuel D. Felsing
By
Bradford & Hood
Attorneys

ANDREW B. GRAHAM CO., PHOTO-LITHOGRAPHERS, WASHINGTON, D. C.

UNITED STATES PATENT OFFICE.

SAMUEL D. FELSING, OF CROOKSTON, MINNESOTA.

PNEUMATIC STRAW-STACKER.

13,039. Specification of Reissued Letters Patent. Reissued Nov. 16, 1909.

Original No. 747,397, dated December 22, 1903, Serial No. 146,373. Application for reissue filed January 13, 1905. Serial No. 240,972.

*To all whom it may concern:*

Be it known that I, SAMUEL D. FELSING, a citizen of the United States, residing at Crookston, in the county of Polk and State of Minnesota, have invented certain new and useful Improvements in Pneumatic Straw-Stackers, of which the following is a specification.

The object of my invention is to produce a pneumatic or wind stacker mechanism of such character that the straw will not pass through the fan structure; and of such character that the straw may be directed to any desired point by means of adjustable co-acting chute sections.

A further object of my invention is to provide a construction in which the chaff and finer stuff may be received directly from the screen shoes of the separator and passed through the fan casing, and from thence into the main chute, the construction being such that any heavy objects such as wrenches, cylinder teeth and the like which may have accidentally passed through the separator will drop directly through the receiving hopper without passing into the fan or the straw chute.

A further object of my invention is to provide means by which the stacker structure may be easily adjusted laterally with relation to the main body of the separator.

A further object of my invention is to provide improved means for adjusting the straw chute sections by means of which the straw may be directed to any desired point; and to provide such other improvements in detail of construction as may be hereafter pointed out.

In the drawings, I have shown my invention embodied in a structure separate and independently of the threshing machine, but it is to be understood that the improvements described may be as readily incorporated in or made a part of the main separator structure without departing from my invention.

Figure 2:
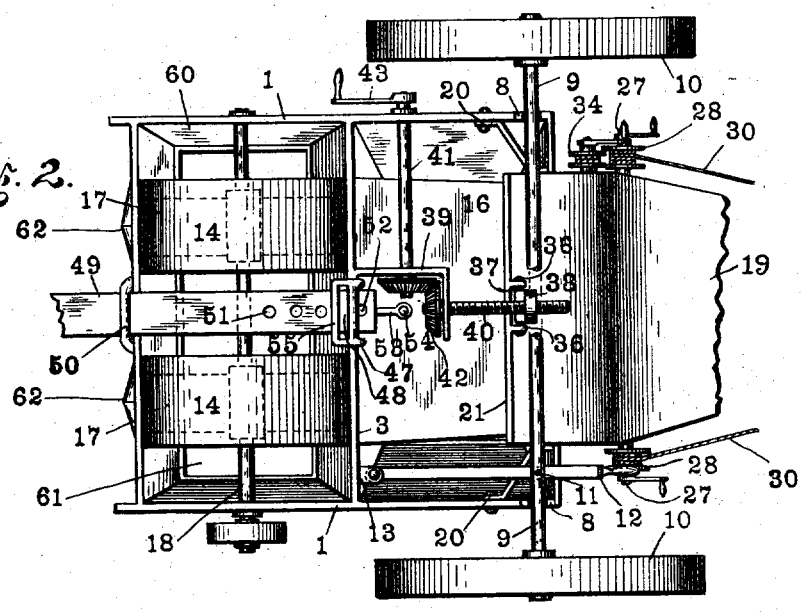
Figure 3:
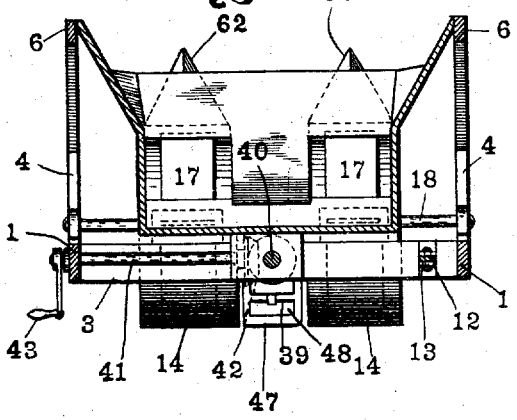
Figure 4:
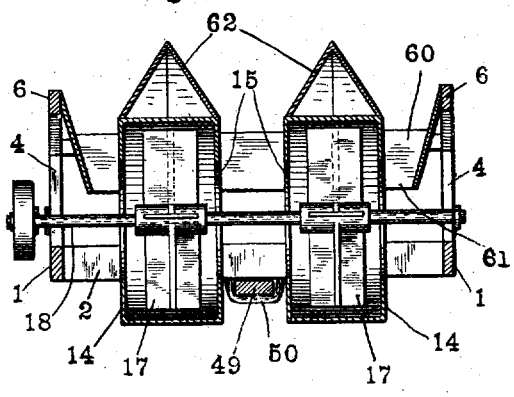

Referring to the accompanying drawings, which are made a part hereof, and on which similar reference characters indicate similar parts, Figure 1 is a view partially in side elevation and partially in longitudinal vertical section of a pneumatic stacker constructed in accordance with the principles of my invention; Fig. 2 is an underside plan view of the lower portion of the stacker; and Figs. 3 and 4 transverse vertical sectional views as seen when looking in the direction indicated by the dotted lines 3 3 and 4 4, respectively, in Fig. 1.

The structure, as shown, consists of supporting wheels 10 and a connecting axle 9 upon which the wheels freely rotate and upon which is supported a main frame consisting of side pieces 1 1, front pieces 2, cross bar 3, forward uprights 4 4, rear uprights 5 5 which are somewhat higher than the uprights 4, 4, inclined sides 6, 6 connecting the tops of the uprights 4 and 5, and suitable braces 7. This frame-work is provided at its rear end with downwardly projecting yokes 8 which straddle the axle 9, and a lever 12 is pivoted at 13 on the frame, and has a slotted engagement with a pin 11 extending upward from the axle 9, the arrangement being such that, by swinging lever 12 upon pin 11 as a fulcrum, the entire frame may be shifted transversely, sliding on the axle 9.

Mounted in the forward end of the frame are two vertical fan casings 14, each of which is provided in its sides with eyes 15. Each fan casing is provided with a short horizontal discharge, which both lead into the forward side of the bottom of a hopper 16, the walls of which flare outwardly and upwardly to receive straw from the separator. Journaled in suitable bearings on the frame is a shaft 18 which passes through the eyes of both fan casings and carries a pair of fans 17, 17, one in each casing.

Pivoted to the braces 7 of the supporting frame are two arms 20 to the lower ends of which is secured an air trunk section which slides over the rear projecting discharge end of the hopper 16, the bottoms of said hopper end and the forward end of the air trunk section 19 being substantially concentric with the pivot points of the arms 20. The air trunk 19 at its rear is brought to a throat 21 over which is sleeved the forward one of a series of semi-cylindrical pivotally connected sections 23. Sleeved over the rear one of the series of sections 23, and pivoted thereto, is an air trunk section 24 to which is hinged an air trunk section 25, said section carrying on its outer end a plurality of pivotally connected hood sections 26. Journaled on the section 19 is a shaft 27 which carries at each end a winding drum 28, and is also provided with a suitable operating crank 29. Ropes 30 extend from the drums 28 to opposite sides of the section 24, one of the ropes passing under its drum and the other rope passing over its drum.

Pivoted to the upper side of the section 25 near its forward or outer end is an upwardly extending arm 31 to which is secured an intermediate point of a rope 33. The rope 33 is attached at its rear end 32 to one or more of the hood sections 26 and at its forward end 33 is passed around a suitable winding drum 34 journaled on the section 19. The construction of the flexible connection and of the adjusting means thus far described is not materially different from that shown in Letters Patent to Samuel D. Felsing and Elias G. Gustafson, No. 696,954, granted April 8, 1902.

The under side of the section 19 is provided with a pair of ears 36 in which is journaled a short horizontal shaft 37 carrying a downwardly hanging nut 38 which is adapted to receive a screw-threaded shaft 40 which is journaled in a suitable bracket 39 attached to the cross bar 3 and to the under side of the hopper 16. Journaled in the bracket 39 and extending transversely out to beyond one side of the main frame is a shaft 41 and the two shafts 41 and 40 carry gears 42 which mesh with each other. Shaft 41 is provided at its outer end with a crank 43 by means of which each may be rotated, thus serving to rotate the screw-threaded shaft 40 so as to shift nut 38 thereon, and thus swing the section 19, together with all parts attached thereto about the pivots of the arms 20. This adjusting device, because of the pivoted mounting of the nut, cannot become cramped in any position of adjustment.

The section 25 is pivotally attached at 44 to the section 24 and the two sections are provided opposite the hinge 44 with mating ears 45 through which a bolt 46 may be passed to secure the parts in operating position. The same rope which serves to adjust the hood sections also serves to swing the outer straw chute section toward folded position.

Depending from the cross-bar 3 of the frame is a link or clevis 47, having a plurality of openings 48, of which two have been shown in the drawings. The lower end of said clevis is forwardly curved to adapt it to receive the rear end of a tongue or traction-bar 49, the front end of which is supported in a clevis 50, depending from the front cross-bar 2 of the frame. The tongue or draft-bar is provided with a plurality of vertical perforations 51, through any one of which a key or pin 52 may be inserted in rear of the clevis 47, with relation to which the said tongue is thus made adjustable. Said tongue is also provided at its rear end with a pair of rearwardly-extending arms 53, disposed one above the other and provided at their rear ends with loops or eyes 54, which will be adapted to receive the fastening pin or key 52 when said arms are placed in engagement with one of the cross-bars 55 of the clevis 47, with which a loose connection may thus be established, which is frequently desirable when the machine is being transported over rough roads.

The side bar 6 at each side of the frame is provided with an outwardly-extending stud 56, adapted to be engaged by a loop or eye 57, formed at the lower end of each side of the folding-frame 58 of a hood 59, which may thus be mounted or supported above the hopper in order to prevent any possibility of any part of the straw being blown out of said hopper, no matter how rapid may be the feed or how strong the blast. When not in use, the hood may be conveniently folded, as will be readily understood, so as to be out of the way.

The straw is discharged into a hopper 16 being guided thereinto by the head 59. The chaff and like stuff, however, drops into a hopper structure 60 which extends transversely across the tops of the fan casings, and leads to the eyes thereof. This hopper 60 has an open bottom, as at 61 so that, while material will be directed by the hopper toward the eyes 15 only the light stuff such as chaff and the like will be drawn through the eyes of the fan casings, any foreign heavy substance such as wrenches, cylinder teeth, and the like will drop through the open bottom and thus cannot be drawn into the fans.

In order to prevent a lodgment of material on the tops of the fan casings, I arrange on each of said casings an inverted V-shaped guard 62 which thus serves to direct the material from the top of the fan casings into one portion or another of the hopper 60. The fan casings, extending up into the hopper 60, divide it into several portions which may be considered, if desired, as a series of hoppers between which the fan casings are located.

I claim as my invention:

1. In a pneumatic straw-stacker, the combination of a hopper, means for forcing a blast of air into said hopper, and an extension forming an air-trunk connected flexibly with said hopper, the latter and the air-trunk having segmental, overlapping parts concentric with the pivot whereby said parts are connected.

2. In a pneumatic straw-stacker, a hopper, means for directing a blast of air into said hopper, an extension forming an air-trunk, arms extending from the latter and having pivotal connection with the frame of the hopper, and segmental overlapping portions upon the hopper and air-trunk.

3. In a pneumatic straw-stacker, a frame, a hopper, means for directing a blast of air into said hopper, an extension forming an air-trunk flexibly engaging said hopper and having arms pivotally connected with the frame, a discharge-spout flexibly connected with the air-trunk, and means for adjusting the latter and for retaining it in adjusted position.

4. In a device of the class described, a hopper, an extension forming an air-trunk flexibly connected with said hopper, a nut hingedly-connected with said extension, a screw-threaded shaft engaging said nut, an operating-shaft, supporting means for said shafts, and miter-gearing connecting said shafts.

5. In a device of the class described, a frame supporting a hopper, means for producing a blast of air, and a straw-exit, said frame being provided with depending supporting-boxes, in combination with a supporting rod or axle having an upwardly-extending pin, and a shifting lever connected with the frame and pivotally engaging the said pin.

6. In a device of the class described, a hopper, an extension forming an air-trunk flexibly connected therewith, a discharge-spout comprising two members hingedly connected, the lower member of said spout being flexibly connected with the air-trunk and the upper member of said spout being provided with a flexible hood, means for adjusting the said spout, a hinged bracket upon the upper member of the latter, a winding drum, and a rope connected with said bracket and having one of its ends connected with the winding drum and the other end with the flexible hood.

7. In a device of the class described, a frame, a hopper, fan-casings supported in front of said hopper and discharging into the front end of the latter, said fan-casings having upper inverted-V-shaped portions and air-intakes in the sides thereof, a shaft journaled upon the sides of the frame and extending through the fan-casings, and fans upon said shaft, within the fan-casings.

8. In a device of the class described, a hopper, an extension forming an air-trunk flexibly connected with said hopper, a screw-threaded shaft, and a coöperating nut hinged to the adjustable air-trunk on an axis parallel with the pivot of the air trunk.

9. In a straw-stacker, the combination of a casing forming the body of the stacker and provided with front and rear hoppers, fan-casings mounted in the rear portions of the said casing and located between the rear hoppers and provided with caps having oppositely-inclined sides, and fans operating in the fan-casings, substantially as described.

In witness whereof, I have hereunto set my hand and seal at Crookston, Minnesota, this 29 day of December A. D. one thousand nine hundred and four.

SAMUEL D. FELSING. [L. S.]

Witnesses:
AUTH PAULSBERG,
A. P. JOHNSON.